United States Patent
Nair et al.

(10) Patent No.: US 12,153,633 B2
(45) Date of Patent: Nov. 26, 2024

(54) PREPACKAGED DATA INGESTION FROM VARIOUS DATA SOURCES

(71) Applicant: Salesforce, Inc., San Francisco, CA (US)

(72) Inventors: Vineeth Anand Nair, Fremont, CA (US); Shengfan He, West New York, NJ (US); Jason Day, Fortville, IN (US); Caroline Casey Logue, New York, NY (US); Bradley Carroll Wright, San Francisco, CA (US); Raveendrnathan Loganathan, Sammamish, WA (US)

(73) Assignee: Salesforce, Inc., San Francisco, CA (US)

( * ) Notice: Subject to any disclaimer, the term of this patent is extended or adjusted under 35 U.S.C. 154(b) by 583 days.

(21) Appl. No.: 16/779,298

(22) Filed: Jan. 31, 2020

(65) Prior Publication Data

US 2020/0394225 A1    Dec. 17, 2020

Related U.S. Application Data

(60) Provisional application No. 62/861,928, filed on Jun. 14, 2019.

(51) Int. Cl.
| | |
|---|---|
| *G06F 16/00* | (2019.01) |
| *G06F 16/903* | (2019.01) |
| *G06F 16/9035* | (2019.01) |
| *G06N 20/00* | (2019.01) |
| *H04L 51/58* | (2022.01) |

(52) U.S. Cl.
CPC .... *G06F 16/9035* (2019.01); *G06F 16/90335* (2019.01); *G06N 20/00* (2019.01); *H04L 51/58* (2022.05)

(58) Field of Classification Search
CPC ........................ G06F 16/9035; G06F 16/90335
USPC .......................................................... 707/687
See application file for complete search history.

(56) References Cited

U.S. PATENT DOCUMENTS

| | | | |
|---|---|---|---|
| 9,971,803 B2* | 5/2018 | Rehman | G06F 16/951 |
| 10,445,170 B1* | 10/2019 | Subramanian | G06N 20/10 |
| 10,572,903 B2* | 2/2020 | Wiener | G06Q 30/0255 |
| 10,616,415 B1* | 4/2020 | Howard | H04M 3/5141 |
| 10,977,222 B1* | 4/2021 | Esman | G06F 16/211 |
| 11,075,984 B1* | 7/2021 | Mercier | H04L 43/20 |
| 11,157,295 B2* | 10/2021 | Schur | G06F 3/0484 |
| 11,191,013 B1* | 11/2021 | Kalkunte | H04W 64/003 |
| 11,221,778 B1* | 1/2022 | Miller | G06F 16/1752 |
| 11,238,048 B1* | 2/2022 | Breeden | G06F 16/906 |
| 11,314,819 B2* | 4/2022 | Katzman | G06F 16/31 |

(Continued)

*Primary Examiner* — Mariela Reyes
*Assistant Examiner* — Rezwanul Mahmood
(74) *Attorney, Agent, or Firm* — Holland & Hart LLP

(57) ABSTRACT

An application may support ingestion of data to a data server. A user may identify the data source, and the server may determine a connector corresponding to the identified data source. The server may support a plurality of connectors for data ingestion. Based on the selected source, the user may select a data channel type, where the data channel type is associated with one or more packaged data sets that include different data set types. The server may then ingest the data set using the determined connector. The application may further support mapping of source and target attributes, custom mapping, and transformation functions.

20 Claims, 11 Drawing Sheets

(56) References Cited

U.S. PATENT DOCUMENTS

| | | | | |
|---|---|---|---|---|
| 11,323,532 B1* | 5/2022 | Bhutani | | H04L 67/561 |
| 11,386,152 B1* | 7/2022 | Arowesty | | G06F 16/9536 |
| 11,537,627 B1* | 12/2022 | Baskaran | | G06F 16/951 |
| 11,853,371 B1* | 12/2023 | Zhou | | G06N 5/025 |
| 2010/0189122 A1* | 7/2010 | Dandekar | | H04L 65/762 |
| | | | | 370/412 |
| 2011/0093468 A1* | 4/2011 | McAlvany | | G06F 16/93 |
| | | | | 707/758 |
| 2011/0276636 A1* | 11/2011 | Cheng | | H04L 69/18 |
| | | | | 709/206 |
| 2013/0205364 A1* | 8/2013 | Kiehtreiber | | H04L 63/20 |
| | | | | 726/1 |
| 2015/0019480 A1* | 1/2015 | Maquaire | | G06F 16/2365 |
| | | | | 707/609 |
| 2016/0063209 A1* | 3/2016 | Malaviya | | G16H 50/50 |
| | | | | 706/12 |
| 2016/0210427 A1* | 7/2016 | Mynhier | | G16H 10/60 |
| 2016/0224615 A1* | 8/2016 | Rehman | | G06F 16/951 |
| 2017/0142113 A1* | 5/2017 | Bourgeois | | G06F 16/178 |
| 2017/0277727 A1* | 9/2017 | Chen | | G06F 16/215 |
| 2018/0101584 A1* | 4/2018 | Pattnaik | | G06F 9/38 |
| 2018/0121539 A1* | 5/2018 | Ciulla | | G06F 16/3344 |
| 2018/0213046 A1* | 7/2018 | Cherdabayev | | G06Q 50/01 |
| 2019/0042988 A1* | 2/2019 | Brown | | G06F 16/9535 |
| 2019/0066664 A1* | 2/2019 | Miller | | G10L 19/018 |
| 2019/0149548 A1* | 5/2019 | Palmer | | G06F 16/9038 |
| | | | | 726/4 |
| 2019/0370233 A1* | 12/2019 | Yamashita | | G06F 16/254 |
| 2020/0021134 A1* | 1/2020 | Caruso | | G06Q 50/06 |
| 2020/0042626 A1* | 2/2020 | Curtis | | G06F 16/2443 |
| 2020/0136431 A1* | 4/2020 | Huberman | | H04L 41/145 |
| 2020/0192728 A1* | 6/2020 | Miranda | | G06F 9/4881 |
| 2020/0265055 A1* | 8/2020 | Venkoba | | G06F 16/248 |
| 2020/0380024 A1* | 12/2020 | Guha | | G06F 16/258 |
| 2020/0394225 A1* | 12/2020 | Nair | | G06N 20/00 |
| 2020/0394237 A1* | 12/2020 | Nair | | G06F 16/2428 |
| 2021/0034581 A1* | 2/2021 | Boven | | G06F 16/212 |
| 2021/0357783 A1* | 11/2021 | Cogan | | G06Q 10/04 |
| 2021/0385124 A1* | 12/2021 | Roy | | H04L 43/0823 |
| 2021/0398024 A1* | 12/2021 | Pargunarajan | | G06F 40/30 |
| 2022/0108262 A1* | 4/2022 | Cella | | G06Q 10/063118 |
| 2022/0405619 A1* | 12/2022 | Ramamurthy | | G06F 16/9024 |
| 2023/0033672 A1* | 2/2023 | Nayak | | G08G 1/0175 |
| 2023/0169101 A1* | 6/2023 | Yuan | | G06N 3/045 |
| | | | | 707/722 |
| 2023/0185797 A1* | 6/2023 | Oattes | | G06F 16/287 |
| | | | | 707/766 |
| 2023/0207123 A1* | 6/2023 | Schein | | G16H 50/20 |
| 2023/0222379 A1* | 7/2023 | Breen | | G06N 20/00 |
| | | | | 706/12 |

* cited by examiner

PREPACKAGED DATA INGESTION FROM VARIOUS DATA SOURCES

CROSS REFERENCES

The present Application for Patent claims priority to U.S. Provisional Patent Application No. 62/861,928 by Nair et al., entitled "PREPACKAGED DATA INGESTION FROM VARIOUS DATA SOURCES," filed Jun. 14, 2019, assigned to the assignee hereof.

FIELD OF TECHNOLOGY

The present disclosure relates generally to database systems and data processing, and more specifically to prepackaged data ingestion from various data sources.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Data may be stored in one or more cloud platforms, analytics engines, data stores or similar data sources. These different data sources may store data in different formats, use different data structures or coding languages, or may otherwise store data differently. Furthermore, these different data stores may store different types of data. As such, importing data from different data stores into a single analytics platform may include a high degree of technical experience or may otherwise be technically challenging (e.g., manually writing data import scripts).

DETAILED DESCRIPTION

In some examples, a cloud application may support a customer data platform (CDP). A CDP may include one or more applications and may support functionality to ingest data from multiple sources, parse and analyze the data to define and build segments of users based on attributes, and/or activate the segments to further track and analyze customers and their associated data (e.g., communication data, spending data, etc.) to further gain insights regarding a group of customers.

A CDP may include a data setup or import tool that facilitates the ingestion of different types of data from a variety of data sources into the CDP system (e.g., into a data lake). The data setup tool may support prepackaged data stream ingestion (e.g., based on data type and/or organized by channel type), and/or may support customized data ingestion techniques (e.g., extended data stream setup). The CDP data import tool may be configured to import data from a variety of disparate data sources or systems and may be configured to import different types of data (e.g., profile data and engagement/behavior data). Furthermore, the CDP data import tool may be configured for declarative use (e.g., via a guided setup wizard, or guided click-through menus or the like). As such, the CDP data import tool may support the ingestion of data without the involvement of information technology (IT) personnel, and/or without the need for custom-written codes.

Aspects of the disclosure are initially described in the context of an environment supporting an on-demand database service. Aspects of the disclosure are further described in the context of system diagram, and various user interfaces. Aspects of the disclosure are further illustrated by and described with reference to apparatus diagrams, system diagrams, and flowcharts that relate to prepackaged data ingestion from various data sources.

Figure 1:
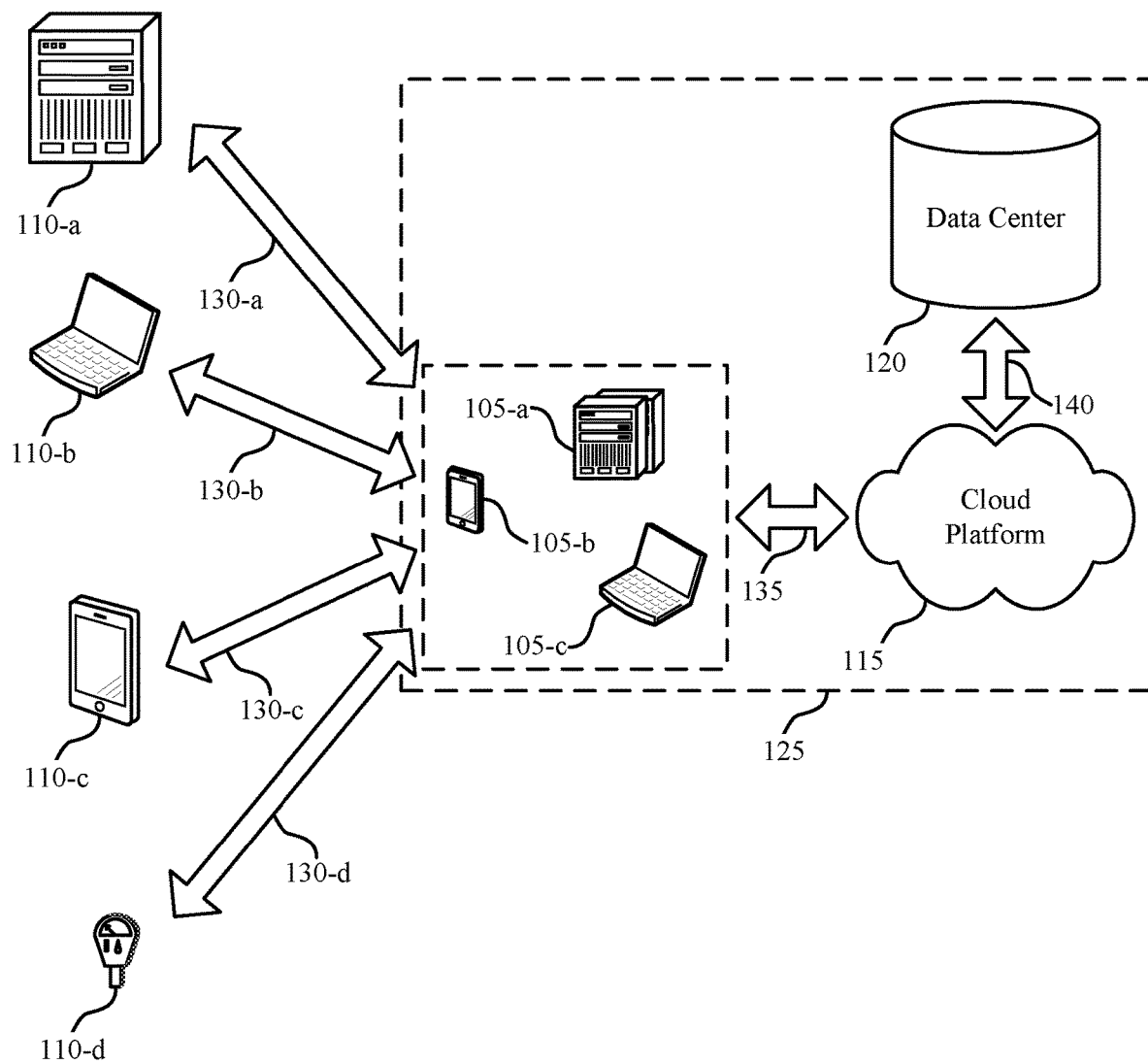
FIG. 1 illustrates an example of a system for data processing that supports prepackaged data ingestion from various data sources in accordance with aspects of the present disclosure.

FIG. 1 illustrates an example of a system 100 for cloud computing that supports prepackaged data ingestion from various data sources in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support a data ingestion application accessible at one or more of the cloud clients 105. The data ingestion application may be utilized to import source data into a target data server. A user of a cloud client 105 may utilize the application to identify one or more data sources for data ingestions. The server (e.g., data center 120) may include a plurality of connectors for ingestion of multiple data set types. Based on a data source indication, the server may identify a connector for data ingestion. The connector may support different data channel types that may be associated with one or more packaged data sets. The connector may ingest the data using a selected data channel type. In some, the connector may utilize automatically determined or user selecting attribute mappings for ingesting the data.

In some systems, data may be stored in one or more cloud platforms, analytics engines, data stores or similar data sources. These different data sources may store data in different formats, use different data structures or coding languages, or may otherwise store data differently. Furthermore, these different data stores may store different types of data. As such, importing data from different data stores into a single analytics platform may include a high degree of technical experience or may otherwise be technically challenging (e.g., manually writing data import scripts).

The data ingestion application of the cloud platform 115 may support various connectors for ingesting data for various different data sources and data types. Further, the application may support automated mapping of source data attributes to target data attributes. Further, the application may support custom mappings, automated and custom transformation functions, and data ingestion status windows.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
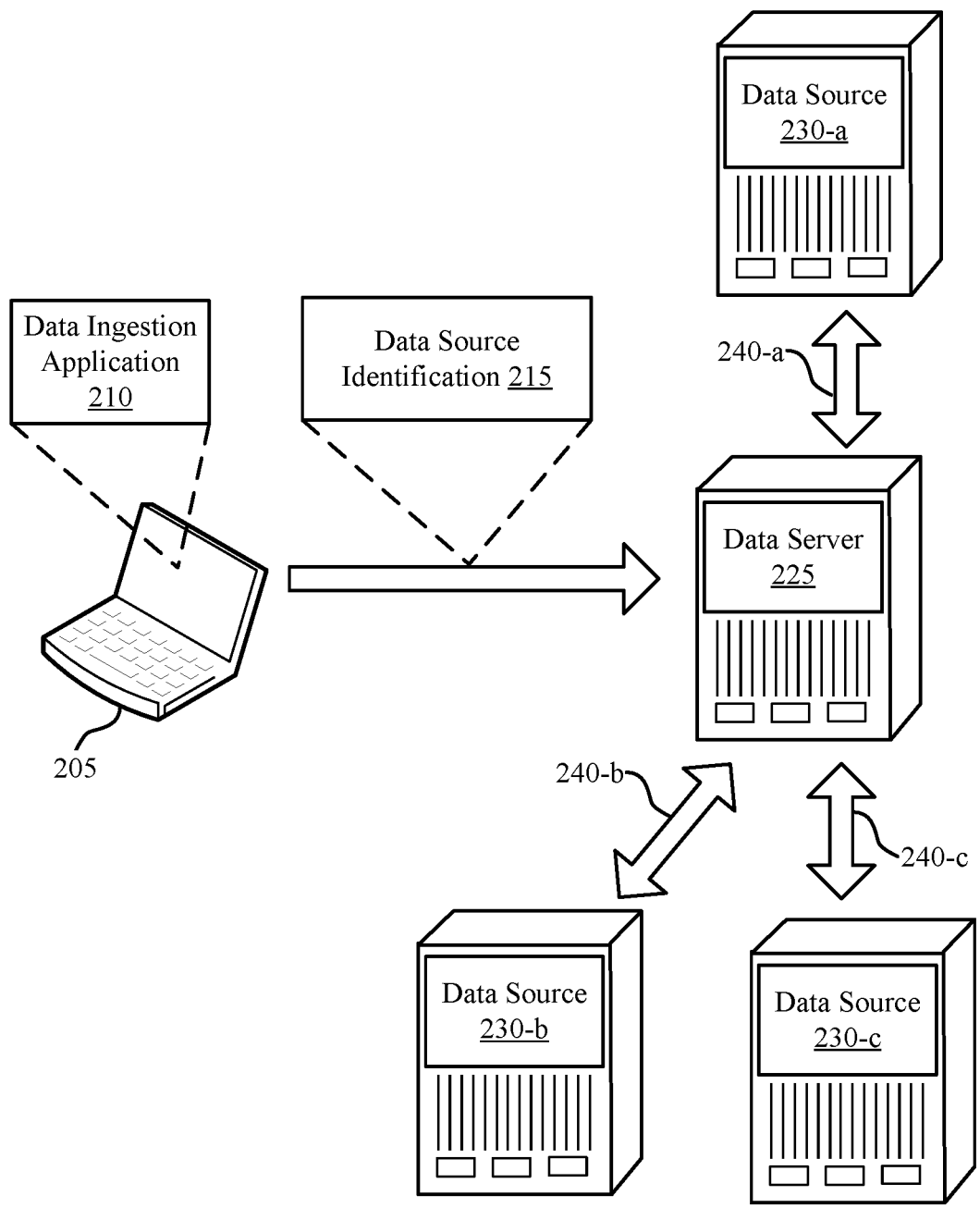
FIG. 2 illustrates an example of a data ingestion system that supports prepackaged data ingestion from various data sources in accordance with aspects of the present disclosure.

FIG. 2 illustrates an example of a system 200 that supports prepackaged data ingestion from various data sources in accordance with various aspects of the present disclosure. The system 200 may implement aspects of FIG. 1. For example, system 200 includes a client device 205, which may be an example of a device at a cloud client 105 or contact 110. The system 200 further includes a data server 225, which may be an example of data subsystem 120 of FIG. 1. The data server 225, with various other components, supports a data ingestion application 210 accessible at client device 205. For example, a user (e.g., marketing manager, IT support user, administrator) of a cloud client 105 of FIG. 1 may access cloud platform 115 of FIG. 1 using the client device 205 and the data ingestion application 210.

The data ingestion application may be utilized to ingest data from various data sources 230 into data server 225. The data server 225 may support various data processing applications and functionality. For example, the data server 225 may utilize data to identify segments of users for marketing, sales, etc. The data server 225 may support various automated marketing campaigns (e.g., email, push notifications, etc.) where interaction with marketing copy is tracked through various data sets. The data server 225 may support communication tracking, interaction etc., and various sales and marketing flows. Thus, the prepackaged data ingestion techniques may be used to import data from internal or external data sources such that the data may be utilized for various processes. The data server and other aspects of the disclosure may be described with respect to sales, marketing, etc., but it should be understood that the prepackaged data ingestion techniques described herein may be implemented by various data systems.

A user at the data ingestion application 210 may select one or more external data sources 230 for data import. For example, the data ingestion application 210 may support a user interface displaying one or more data sources 230 for selection. A user may select a data source (e.g., a data source type or provider), identify a data set at the external data source, and the data ingestion application 210 may transmit a data source identification 215 to the data server 225. For example, a user may select an internal data source, such as "marketing cloud," and the UI may display a field or other UI control for inputting a data set identifier. In some cases, the user is logged in to the data ingestion application 210 and/or the data server 225. As such, when the user selects an internal data source for data ingestion, the data server 225 may automatically identify the data set associated with the user profile from various data sets (e.g., associated with various tenants in a multi-tenant system supported by data server 225). In other cases, when a user selects an external data source 230, the UI of the data ingestion application may display a login screen or other data source identifying control for accessing the external data source. For example, if the user selects an external email system for importing email data, then the application 210 may display a login for the external email system (e.g., an application programming interface (API) associated with the system).

The data server 225 may be configured with various connectors 240 for accessing the data sources 230. Each connector 240 may be configured to access an API supported by the data sources 230. Further, the connectors 240 may include instructions supporting data reading and formatting, field identification (e.g., row identification), etc. In some cases, the fields are identified using the API supported by the data source 230. The connectors 240 may read the data from the external data sources on a one time basis, periodically (e.g., batch), in real-time or near real-time, etc. Thus, when a connection is established with a data source 230 via a connector 240, the connector may maintain the connection and periodically update the data at the data server 225 based on updates at the data source 230.

When a user selects a data source 230, the data source identification 215 is transmitted to the data server 225. The data server determines the connector 240 corresponding to the data source identification 215. Further, the user may input a selection of a data channel type for the data source 230. The data channel type may be associated with one or more packaged data sets formatted for one or more data set types. For example, if a user selects a marketing server as the data source 225, then the user may further select an email channel (e.g., including profile data, engagement data), a SMS message channel, an in-application push messaging channel, or a combination thereof. Each selected channel type may be associated with a pre-packaged (e.g., empty) data set such that the ingested data may be efficiently formatted for the server 225. For example, if the user selects the email channel, then a pre-packaged data set may include fields for open rate, click rate, profile data, etc.

After selection of the channel type, the respective connector may identify fields or attributes in the data set at the data source 230. For example, the connector 240 may identify the attributes associated with the identified data set. Further, the connector, or another component of the data server, may identify a plurality of target attributes associated with a target data table of the data server. For example, the target data table may be associated with the pre-packaged data set and may be populated with data (e.g., previously ingested or generated). The connector 240 may map the source attributes to the target attributes based on a set of automated mapping rules. In some cases, the mapping rules may include instructions for matching an identifier of a source attribute to an identifier of a target attributes. For example, if the source data includes a "name" identifier of an attribute, then the connector 240 may map the attribute corresponding to the "name" attribute to an attribute in the target data table having a "name" or other similar identifier.

In some cases, a mapping rule may be generated using a machine learning model. For example, the data ingestion application 210 may display a user interface showing attributes of the source data set and attributes of the target data set. A user may selectively map the attributes from the source data set to attributes to the target data set using a user interface control component. For example, the source data set may have a first name and last name attribute, which the user mays selectively map to the full name attribute of the target data set. A machine learning model may monitor user mappings to automatically identify such mapping for subsequent data ingestions. As such, at subsequent data ingestions, the user interface of the data ingestion application 210 may display a mapping indicator that indicates the determined mappings between the source attributes and the target attributes. The user may adjust the automatically identified mappings.

In some cases, data ingestion may include data transformation where the data is transformed for storage at the data server 225. For example, yearly salary attribute at the source data set may be transformed to a monthly income attribute at the target data set. Accordingly, the mapping rule may include a formula for transforming the data. Further, a UI at the data ingestion application 210 may display a transformation function indicator for the mapping. The indicator may display the transformation function, additional formulas, a custom function input field, a test field, or a combination thereof. A user may customize the transformation function. In some cases, the transformation function may be automatically generated using machine learning models.

As noted, the data ingestion application 210 may display the mapping indicators for determined or selected mappings. In some cases, the connector 240 may identify unmapped source attributes. The user may selectively map the unmapped source attributes to one or more target attributes. As such, the connector 240 may map the selected unmapped source attributes to the target attribute for data ingestion. Further, after selection or confirmation of mappings, the connector 240 may ingest the source data into the target data table. The data ingestion application 210 may display a data ingestion status window comprising the number of ingested data records, an indication of live data activity feed associated with the ingested data, or a combination thereof.

Figure 3:
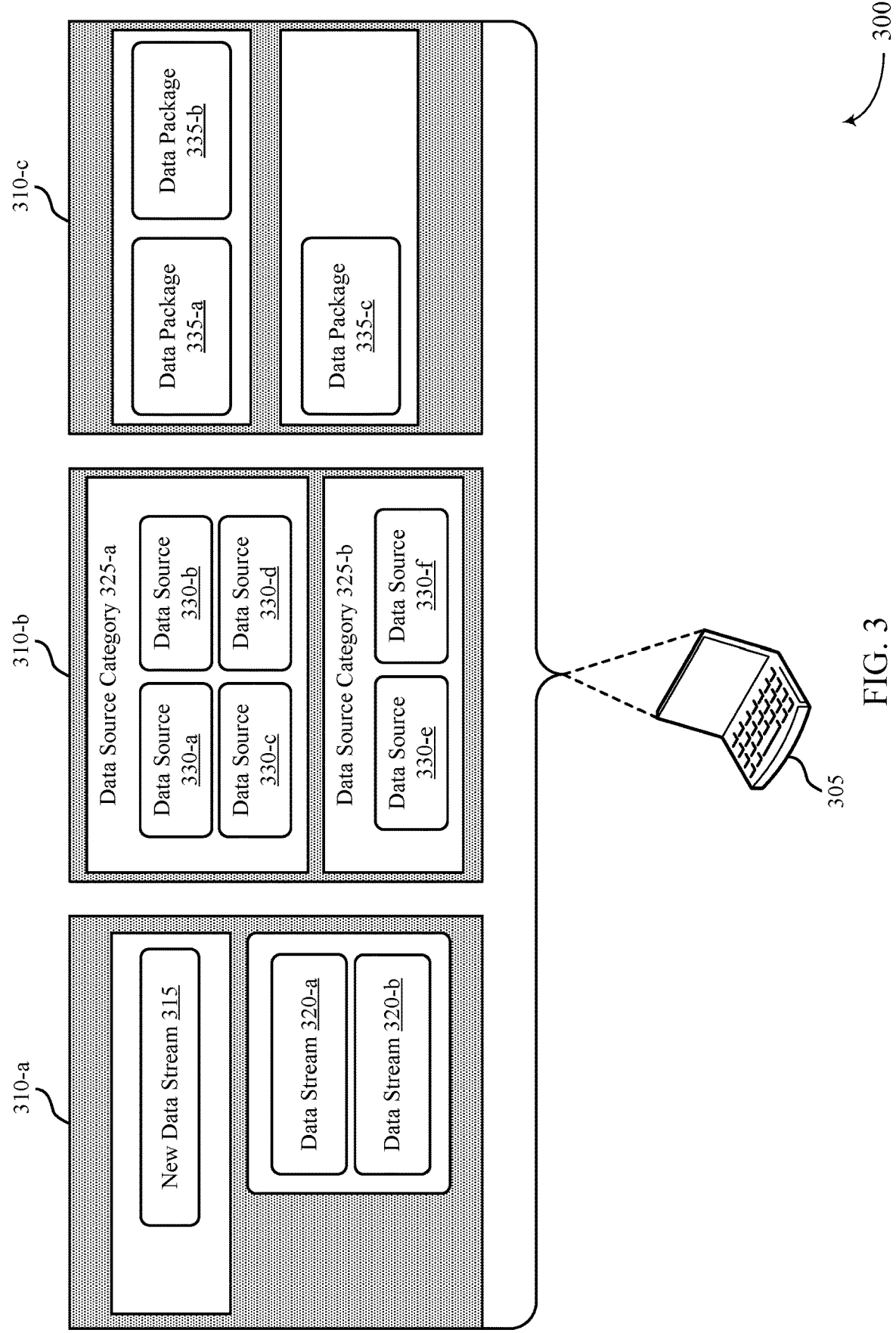
FIG. 3 illustrates an example of a user interface (UI) that supports prepackaged data ingestion from various data sources in accordance with aspects of the present disclosure.

FIG. 3 illustrates an example of a user device 305 including a UI sequence 300 that supports prepackaged data ingestion from various data sources in accordance with aspects of the present disclosure. The UI sequence 300 includes a number of UIs 310. UI 310-a may be an example of a UI that supports the creation of a new data stream. The new data stream control 315 may be used for initiating data ingestion. For example, the user may select the new data stream control 315 to initiate a new data stream, and select data stream 320-*a* for data sources (e.g., streams) that correspond to preconfigured connectors, channels, and prepackaged data sets. Additionally or alternatively, the user may select data stream 320-*b* for data sources (e.g., streams) that correspond to connectors, channels, and prepackaged data sets that are custom, external, or provided by a third-party. However, it is to be understood that the user interface 310 represents an example user interface, and other user interface configurations are supported by the techniques and processes described herein.

Some of the data sources may be associated with relational data. For example, the data sources may be associated with data that contains tables, views, keys (e.g., primary keys, foreign keys, etc.), indexes, data types, schemas, etc. Some of the data sources may be associated with data that is internally (e.g., within an organization that is ingesting the data) maintained. Additionally or alternatively, some of the data sources may be associated with data that is externally (e.g., outside of the organization that is ingesting the data) maintained.

UI 310-*b* may be an example of a UI that supports the selection of a data source. For example, UI 310-*b* may include a number of data source categories 325. For example, data source category 325-*a* may include internal data sources and data source category 325-*b* may include external data sources. The data source categories 325 may include a number of data sources 330. In some cases, the data sources 330 may include data sources 330-*a*, 330-*b*, 330-*c*, 330-*d*, 330-*e*, and 330-*f* In some examples, data source 330-*a* may correspond to a messaging data source, data source 330-*b* may correspond to a sales data source, data source 330-*c* may correspond to a commerce data source, and data source 330-*d* may correspond to a service data source. In some examples, data source 330-*e* may correspond to an external data source such as an external data storage and data source 330-*f* may correspond to a connection to an external data source such as an application programming interface (API), a middleware application, etc.

UI 310-*c* may be an example of a UI that supports the selection of a data package. For example, UI 310-*c* may include a number of data packages 335, and the data packages 335 may include data package 335-*a*, data package 335-*b*, and data package 335-*c*. A data package 335 may be provided, built, or supplied by an internal or external organization. In some cases, the data packages 335 may correspond to data models, and the data models may include information associated with a data source 330, a type of a data source 330, or something similar. For example, the data package 335-*a* may correspond to email data. In some examples, data package 335-*a* may include information associated with the opening of emails (e.g., when an email has been opened, how many times an email has been opened, etc.), the sending of emails (e.g., when an email has been sent, to whom has been an email sent, from whom has an email been sent, how many times an email has been sent, the contents of the send email, etc.), the clicking on of emails (e.g., when an email has been clicked on, by whom has been an email clicked on, how many times has an email been clicked on, etc.), or the bouncing back (e.g., deliver failure) of an email (e.g., when was the email bounced back, who sent the email, who was the intended recipient of the email, etc.).

In some examples, the data package 335-*b* may correspond to mobile data (e.g., short message service (SMS)). In some examples, data package 335-*b* may include information associated with mobile data. The information associated with mobile data may include similar information to the information included in data package 335-*a*. Data package 335-*b* may include additional and/or alternative information to that included in data package 335-*a*. In some cases, the data package 335-*a*, 335-*b*, 335-*c*, or any combination thereof may include engagement data, profile attributes (e.g., email profile attributes, consumer profile attributes, etc.), geographic location data, or any combination thereof.

Figure 4:
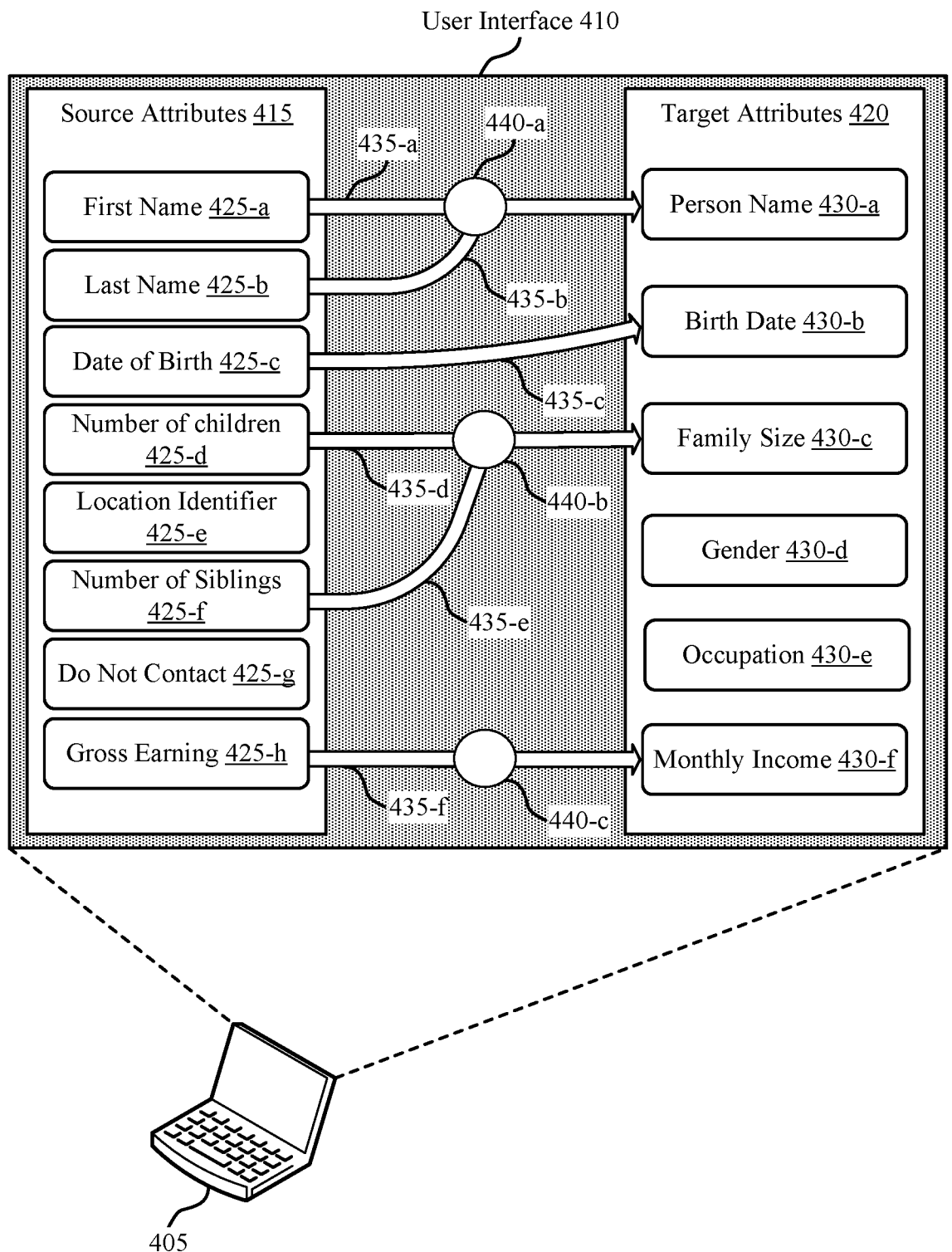
FIG. 4 illustrates an example of a UI that supports prepackaged data ingestion from various data sources in accordance with aspects of the present disclosure.

FIG. 4 illustrates an example of a user device 405 including a UI 410 that supports prepackaged data ingestion from various data sources in accordance with aspects of the present disclosure. The UI 410 includes source attributes 415 and target attributes 420. The source attributes 415 include first name 425-*a*, last name 425-*b*, date of birth 425-*c*, number of children 425-*d*, location identifier 425-*e*, number of siblings 425-*f*, do not contact 425-*g*, and gross earning 425-*h*. The target attributes 420 include person name 430-*a*, birth date 430-*b*, family size 430-*c*, gender 430-*d*, occupation 435-*e*, and monthly income 430-*f*. The UE 410 also includes a number of mapping indicators 435 and a number of transformation function indicators 440. However, it is to be understood that the user interface 410 represents an example user interface, and other user interface configurations are supported by the techniques and processes described herein.

The UI 410 may support prepackaged data ingestion as described with reference to FIGS. 1, 2, and 3. A user may use a user device 405 to interact with the UI 410. In some cases, the UI 410 may support a user in mapping source attributes 415 to target attributes 420. A user may use UI 410 to indicate a mapping of one or more source attributes 415 to one or more target attributes 420. For example, a user may click and drag mapping indicator 435-*a* from first name 425-*a* to person name 430-*a*, and the user may click and drag mapping indicator 435-*b* from last name 425-*b* from to person name 430-*a*. The user may additionally use UI 410 to impose and/or display transformation function indicator 440-*a*. In some examples, transformation function indicator 440-*a* may represent a function, and may be used to transform or more source attributes 415. For example, transformation function indicator 440-*a* may take first name 425-*a* and last name 425-*b* as inputs and transform the two inputs to a concatenation of first name 425-*a* and last name 425-*b*. In some examples, a user may map a source attribute 415, such as date of birth 425-*c*, directly to a target attribute, such as birth date 430-*b*. The use of mapping indicators 435 and/or transformation function indicators 440 may allow a user to configure how data (e.g., data associated with a data source 330) is mapped to a data model (e.g., a data package 335). Mapping source data to a data model may allow a user to gain insights into the data, as the data model may provide and/or support data summaries, predictions, reminders, suggestions, etc.

In some cases, the UI 410 may additionally or alternatively display suggested mappings (e.g., via mapping indicators 435) and/or suggested transformation functions (e.g., via transformation function indicators 440). For example, UI 410 may use mapping indicator 435-*d* to map number of children 425-*d* to transformation function indicator 440-*b* and to map number of siblings 425-*f* to transformation indictor 440-*b*. In some examples, suggested mappings and/or suggested transformation functions may be based on one or more machine learning model (e.g., a binary classification model, a multiclass classification model, etc.). In some examples, one or more machine learning models may be based on (e.g., trained on) mapping indicators 435 and/or transformation function indicators 440. For example, one or more machine learning models may be updated (e.g., weights adjusted) when a suggested mapping indicator 435 is confirmed and/or altered by a user. This may improve the suggestions of mapping indicators 435 and/or transformation function indicators 440 as mapping indicators 435 and/or transformation function indicators 440 are confirmed, rejected, or altered.

In some examples, one or more suggested mappings 435 may be based on a linguistic analysis (e.g., natural language processing (NLP) analysis). Additionally or alternatively, one or more suggested mappings 435 may be based on an analysis of one or more source attributes 415 and/or the metadata associated with one or more source attributes 415. For example, one or more suggested mappings may be based on a type of data associated with one or more source attributes 415, an amount of data associated with one or more source attributes 415, etc. In some examples, one or more suggested mappings may be based on data values associated with one or more source attributes 415. For example, one or more suggested mappings may be based on an enumeration of the possible values of one or more source attributes 415 and/or a number of the possible values associated with one or more source attributes 415. One or more suggested mappings 435 may additionally or alternatively be based on the context of source attributes 415 (e.g., a data source 330 associated with the source attributes 415, a data package 335 associated with the source attributes 415, etc.).

A transformation function indicator 440 may indicate various data transformations (e.g., via a transformation rule). In some examples, a transformation function represented by a transformation function indicator 440 may be indicated by a user (e.g., at a user device 405). For example, a user may click on a transformation function indicator 440-c, and the user may input a transformation function (e.g., y=x/12). In some cases, UI 410 may display one or more transformation functions (e.g., via transformation function indicators 440). For example, the UI 410 may display one or more suggested transformation function indicators 440. In some cases, a user may select one or more transformation function indicators 440 of the one or more displayed possible transformation function indicators 440, and the user may alter the selected one or more transformation function indicators 440.

Figure 5:
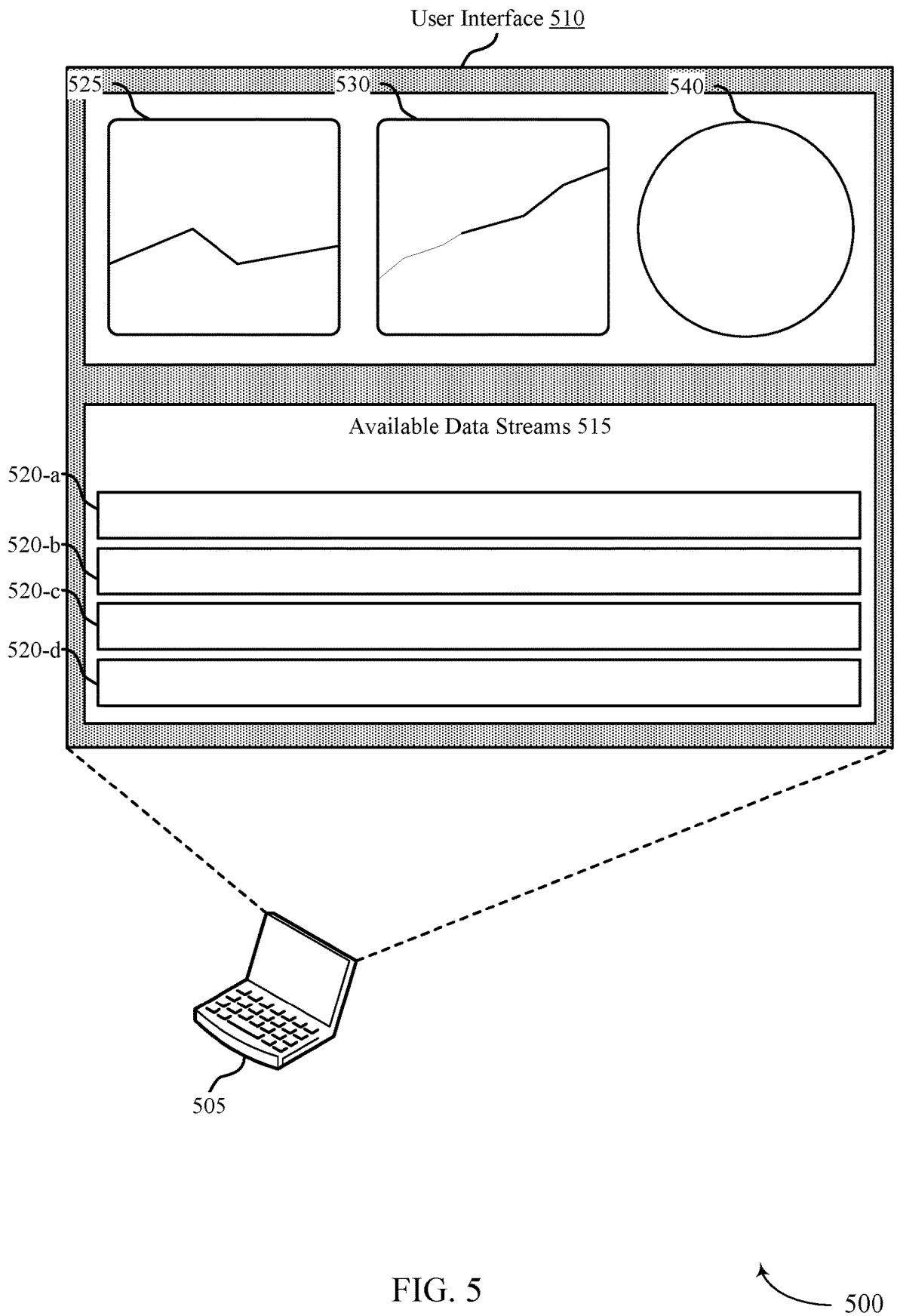
FIG. 5 illustrates an example of a UI that supports prepackaged data ingestion from various data sources in accordance with aspects of the present disclosure.

FIG. 5 illustrates an example of a UI 500 that supports prepackaged data ingestion from various data sources in accordance with aspects of the present disclosure. The UI 500 includes various user interface controls for selecting data channels associated with the selected data source (e.g., using user interface 400 of FIG. 4). For example, the user may select the messaging data source at FIG. 4, and the channels in FIG. 5 (e.g., email, mobile connect, mobile push) may correspond to the selected messaging data source. Each channel may correspond to packaged sets comprising one or more data set types. For example, the email channel may correspond to a email data set stored at a data server. The connector may utilize the packaged data sets for ingestion of data from the data source. However, it is to be understood that the user interface 510 represents an example user interface, and other user interface configurations are supported by the techniques and processes described herein.

The UI 500 may display available data streams 515, and the available data streams 515 may include a number of data streams 520. In some cases data stream 520-a may include information such as a name, a data source, a run status, an indication of the number of rows added in the last ingestion, the status of the stream, or the time the data stream was last refreshed. The UI 500 may support a user in configuring and/or adjusting one or more data streams. For example, a user may indicate what type of data is pulled (e.g., source data, source metadata, all source data, source data that has changed since the last time data was pulled from the source, etc.) and/or the frequency (e.g., once a day, once a week, when source data changes, etc.) at which data is pulled from a data steam. In some examples, a user may click on data stream 520-b to configure data stream 520-b.

The UI 500 may display data stream events summary 525 and ingested records summary 530. Data stream events summary 525 may provide a graphical representation of data stream events. In some cases, data stream events summary 525 may provide a graphical representation of information related to data stream events. For example, data stream events summary 525 may display a trend in the number of data stream events by graphing how many data stream events occur each date. The data stream events summary 525 and/or ingested records summary 530 may be updated automatically based on a schedule (e.g., every day, every hour, etc.) and/or event trigger (the ingesting of records, a data stream events, etc.). In some cases, ingested records summary 530 may provide a graphical representation of information related to ingested records. For example, ingested records summary 530 may display a trend in the number of records that are ingested by graphing how many data records are ingested each date. The data stream events summary 525 and/or ingested records summary 530 may additionally or alternatively display data insights (e.g., metrics, statistics, predictions, etc.). The processed data summary 540 may display how much data has been processed.

Figure 6:
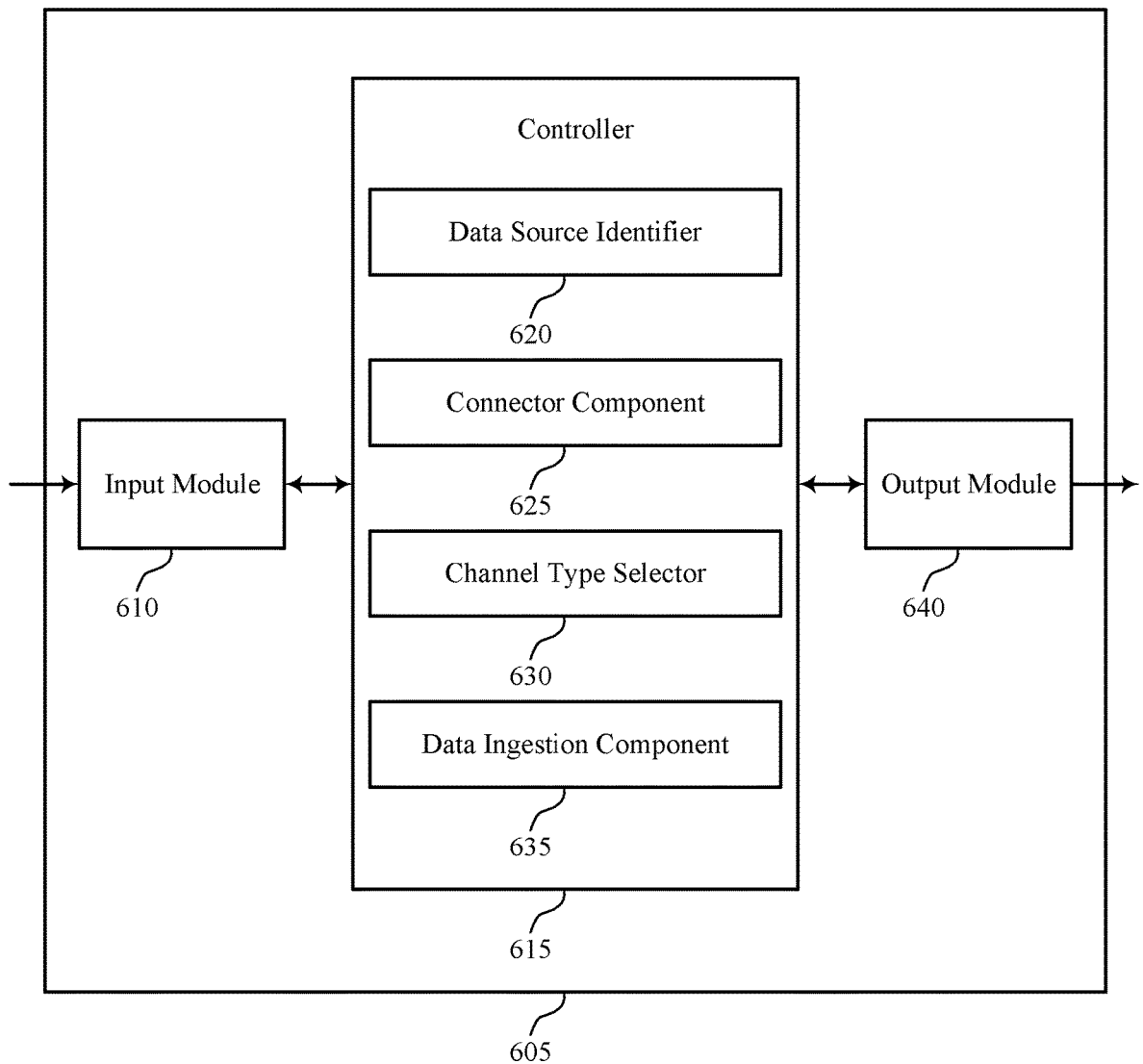
FIG. 6 shows a block diagram of an apparatus that supports prepackaged data ingestion from various data sources in accordance with aspects of the present disclosure.

FIG. 6 shows a block diagram 600 of an apparatus 605 that supports prepackaged data ingestion from various data sources in accordance with aspects of the present disclosure. The apparatus 605 may include an input module 610, a controller 615, and an output module 640. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the controller 615 to support prepackaged data ingestion from various data sources. In some cases, the input module 610 may be a component of an input/output (I/O) controller 815 as described with reference to FIG. 8.

The controller 615 may include a data source identifier 620, a connector component 625, a channel type selector 630, and a data ingestion component 635. The controller 615 may be an example of aspects of the controller 705 or 810 described with reference to FIGS. 7 and 8.

The controller 615 and/or at least some of its various sub-components may be implemented in hardware, software executed by a processor, firmware, or any combination thereof. If implemented in software executed by a processor, the functions of the controller 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The controller 615 and/or at least some of its various sub-components may be physically located at various positions, including being distributed such that portions of functions are implemented at different physical locations by one or more physical devices. In some examples, the controller 615 and/or at least some of its various sub-components may be a separate and distinct component in accordance with various aspects of the present disclosure. In other examples, the controller 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data source identifier 620 may receive, at a data server, an identification of one or more data sources for data ingestion to the data server, where the data server includes a set connectors for ingesting multiple data set types from the one or more data set sources.

The connector component 625 may determine, for each of the one or more data sources, a connector of the set of connectors for ingesting one or more data sets from the one or more data sources.

The channel type selector 630 may receive a selection of a data channel type from a set of data channel types, where each data channel type is associated with one or more packaged data sets including one or more data set types.

The data ingestion component 635 may ingest the one or more packaged data sets from the selected one or more data sources using the determined connector.

The output module 640 may manage output signals for the apparatus 605. For example, the output module 640 may receive signals from other components of the apparatus 605, such as the controller 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
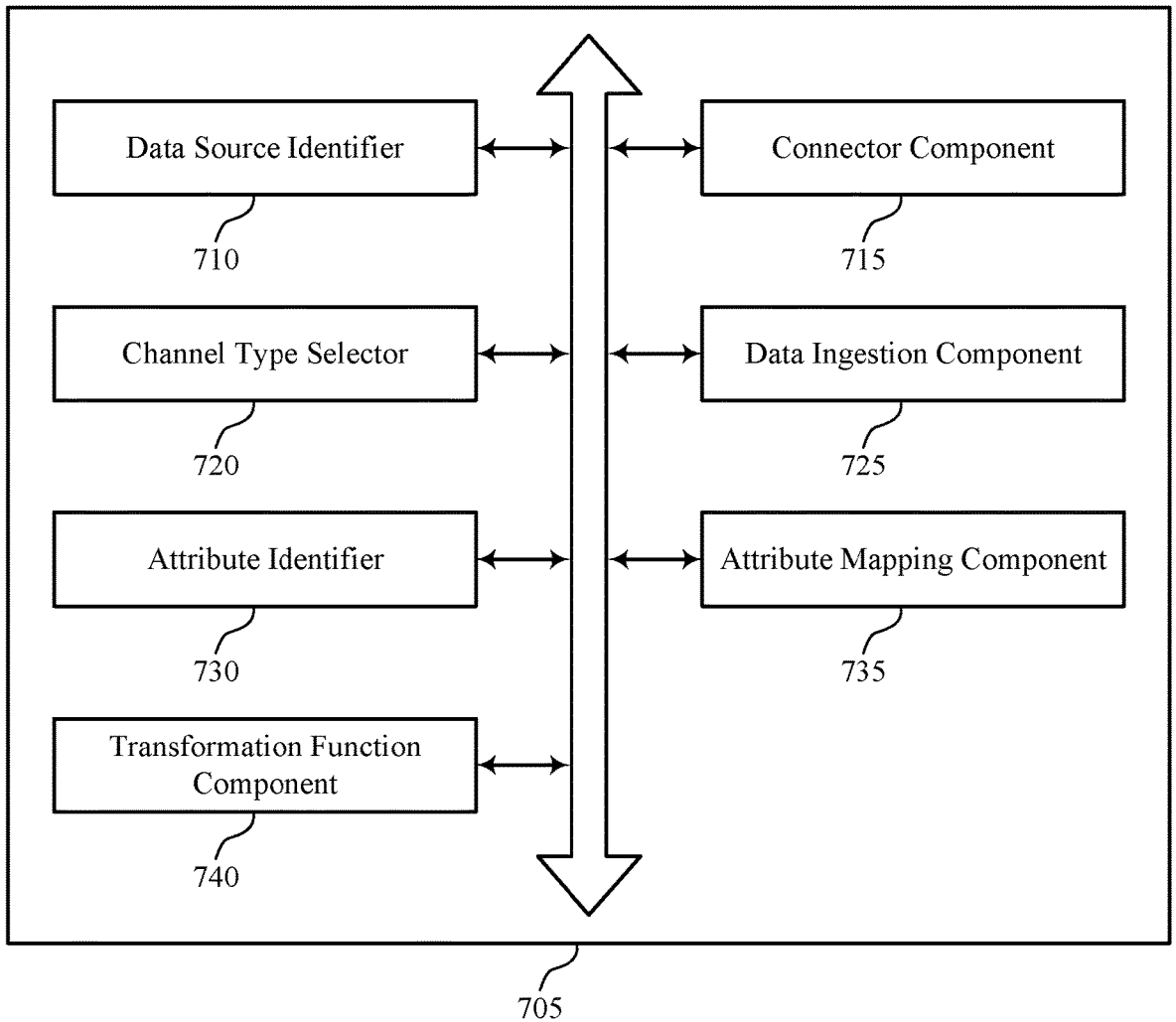
FIG. 7 shows a block diagram of a controller that supports prepackaged data ingestion from various data sources in accordance with aspects of the present disclosure.

FIG. 7 shows a block diagram 700 of a controller 705 that supports prepackaged data ingestion from various data sources in accordance with aspects of the present disclosure. The controller 705 may be an example of aspects of a controller 615 or a controller 810 described herein. The controller 705 may include a data source identifier 710, a connector component 715, a channel type selector 720, a data ingestion component 725, an attribute identifier 730, an attribute mapping component 735, and a transformation function component 740. Each of these modules may communicate, directly or indirectly, with one another (e.g., via one or more buses).

The data source identifier 710 may receive, at a data server, an identification of one or more data sources for data ingestion to the data server, where the data server includes a set connectors for ingesting multiple data set types from the one or more data set sources.

In some cases, the one or more data sources include internal data sources, external data sources, or both.

The connector component 715 may determine, for each of the one or more data sources, a connector of the set of connectors for ingesting one or more data sets from the one or more data sources.

The channel type selector 720 may receive a selection of a data channel type from a set of data channel types, where each data channel type is associated with one or more packaged data sets including one or more data set types.

In some cases, the data channel type includes an email channel, a short message service (SMS) messaging channel, an in-application push messaging channel, or a combination thereof.

The data ingestion component 725 may ingest the one or more packaged data sets from the selected one or more data sources using the determined connector.

In some examples, the data ingestion component 725 may display a data ingestion status window including an indication of a number of ingested data records, an indication of a live data activity feed associated with the ingested data, or a combination thereof.

The attribute identifier 730 may identify a set of source attributes associated with the one or more data sets from the one or more selected data sources.

In some examples, the attribute identifier 730 may identify a set of target attributes associated with a target data table of the data server.

In some cases, an identifier of at least one source attribute is different than an identifier of at least one corresponding mapped target attribute.

The attribute mapping component 735 may map a set of the set of source attributes to a set of the set of target attributes based on a set of automated mapping rules.

In some examples, the attribute mapping component 735 may match an identifier of one or more source attributes to an identifier of one or more target attributes.

In some examples, the attribute mapping component 735 may display a mapping indicator indicating a mapping between the set of the set of source attributes and the set of the set of target attributes.

In some examples, the attribute mapping component 735 may display a manual mapping indicator for one or more unmapped source attributes.

In some examples, the attribute mapping component 735 may map the one or more unmapped source attributes to one or more unmapped target attributes based on user input via the manual mapping indicator.

The transformation function component 740 may generate a transformation function for one or more of the set of the set of source attributes, where the transformation function transforms an attribute type from a first type associated with the source attribute to a second type associated with the target attribute.

In some examples, the transformation function component 740 may run a machine learning model to generate the set of automated mapping rules.

In some examples, the transformation function component 740 may display a transformation function indicator indicating a selected transformation function, one or more additional transformation formulas, a custom transformation function input field, a transformation function test field, or a combination thereof.

Figure 8:
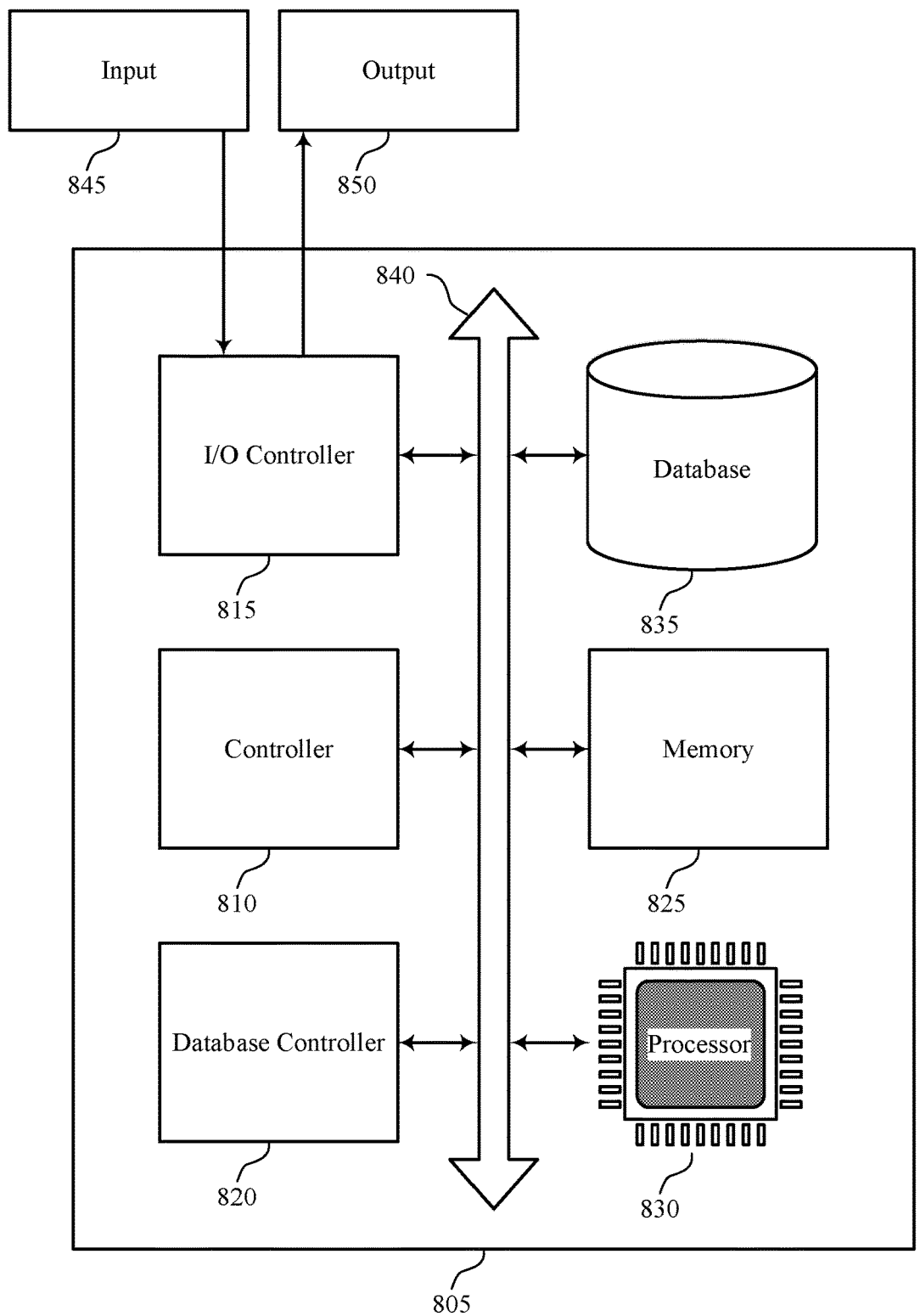
FIG. 8 shows a diagram of a system including a device that supports prepackaged data ingestion from various data sources in accordance with aspects of the present disclosure.

FIG. 8 shows a diagram of a system 800 including a device 805 that supports prepackaged data ingestion from various data sources in accordance with aspects of the present disclosure. The device 805 may be an example of or include the components of a database server or an apparatus 605 as described herein. The device 805 may include components for bi-directional data communications including components for transmitting and receiving communications, including a controller 810, an I/O controller 815, a database controller 820, memory 825, a processor 830, and a database 835. These components may be in electronic communication via one or more buses (e.g., bus 840).

The controller 810 may be an example of a controller 615 or 705 as described herein. For example, the controller 810 may perform any of the methods or processes described above with reference to FIGS. 6 and 7. In some cases, the controller 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting prepackaged data ingestion from various data sources).

Figure 9:
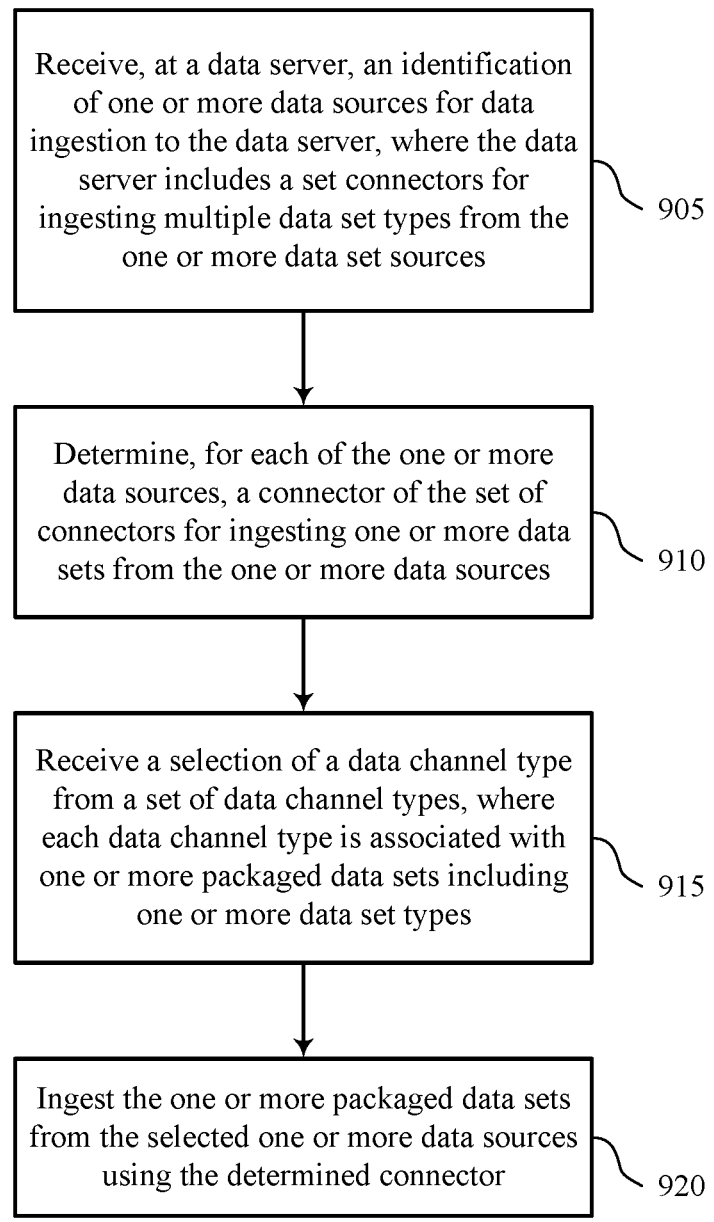
FIGS. 9 through 11 show flowcharts illustrating methods that support prepackaged data ingestion from various data sources in accordance with aspects of the present disclosure.

FIG. 9 shows a flowchart illustrating a method 900 that supports prepackaged data ingestion from various data sources in accordance with aspects of the present disclosure. The operations of method 900 may be implemented by a database server or its components as described herein. For example, the operations of method 900 may be performed by a controller as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 905, the database server may receive, at a data server, an identification of one or more data sources for data ingestion to the data server, where the data server includes a set connectors for ingesting multiple data set types from the one or more data set sources. The operations of 905 may be performed according to the methods described herein. In some examples, aspects of the operations of 905 may be performed by a data source identifier as described with reference to FIGS. 6 through 8.

At 910, the database server may determine, for each of the one or more data sources, a connector of the set of connectors for ingesting one or more data sets from the one or more data sources. The operations of 910 may be performed according to the methods described herein. In some examples, aspects of the operations of 910 may be performed by a connector component as described with reference to FIGS. 6 through 8.

At 915, the database server may receive a selection of a data channel type from a set of data channel types, where each data channel type is associated with one or more packaged data sets including one or more data set types. The operations of 915 may be performed according to the methods described herein. In some examples, aspects of the operations of 915 may be performed by a channel type selector as described with reference to FIGS. 6 through 8.

At 920, the database server may ingest the one or more packaged data sets from the selected one or more data sources using the determined connector. The operations of 920 may be performed according to the methods described herein. In some examples, aspects of the operations of 920 may be performed by a data ingestion component as described with reference to FIGS. 6 through 8.

Figure 10:
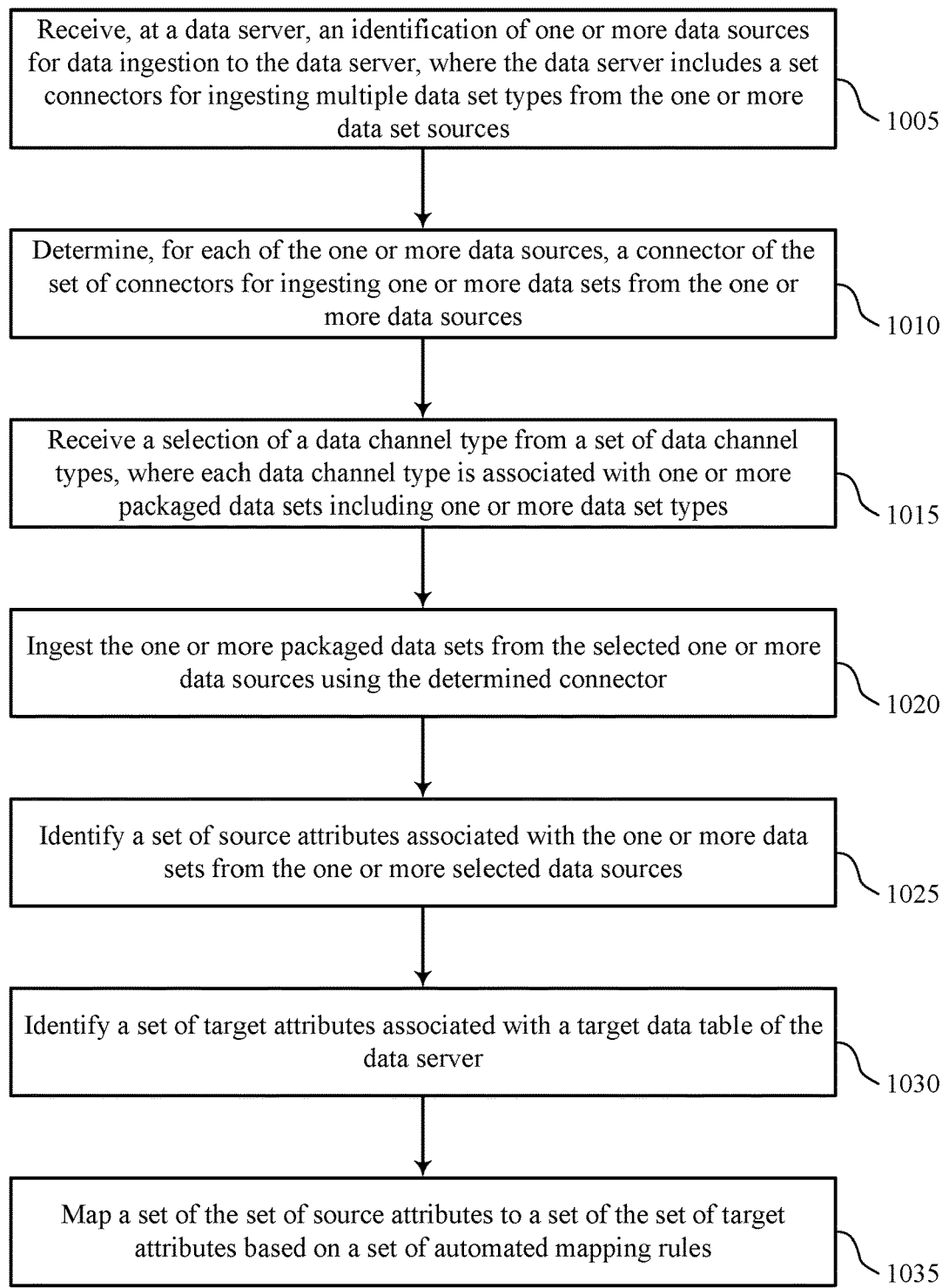

FIG. 10 shows a flowchart illustrating a method 1000 that supports prepackaged data ingestion from various data sources in accordance with aspects of the present disclosure. The operations of method 1000 may be implemented by a database server or its components as described herein. For example, the operations of method 1000 may be performed by a controller as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1005, the database server may receive, at a data server, an identification of one or more data sources for data ingestion to the data server, where the data server includes a set connectors for ingesting multiple data set types from the one or more data set sources. The operations of 1005 may be performed according to the methods described herein. In some examples, aspects of the operations of 1005 may be performed by a data source identifier as described with reference to FIGS. 6 through 8.

At 1010, the database server may determine, for each of the one or more data sources, a connector of the set of connectors for ingesting one or more data sets from the one or more data sources. The operations of 1010 may be performed according to the methods described herein. In some examples, aspects of the operations of 1010 may be performed by a connector component as described with reference to FIGS. 6 through 8.

At 1015, the database server may receive a selection of a data channel type from a set of data channel types, where each data channel type is associated with one or more packaged data sets including one or more data set types. The operations of 1015 may be performed according to the methods described herein. In some examples, aspects of the operations of 1015 may be performed by a channel type selector as described with reference to FIGS. 6 through 8.

At 1020, the database server may ingest the one or more packaged data sets from the selected one or more data sources using the determined connector. The operations of 1020 may be performed according to the methods described herein. In some examples, aspects of the operations of 1020 may be performed by a data ingestion component as described with reference to FIGS. 6 through 8.

At 1025, the database server may identify a set of source attributes associated with the one or more data sets from the one or more selected data sources. The operations of 1025 may be performed according to the methods described herein. In some examples, aspects of the operations of 1025 may be performed by an attribute identifier as described with reference to FIGS. 6 through 8.

At 1030, the database server may identify a set of target attributes associated with a target data table of the data server. The operations of 1030 may be performed according to the methods described herein. In some examples, aspects of the operations of 1030 may be performed by an attribute identifier as described with reference to FIGS. 6 through 8.

At 1035, the database server may map a set of the set of source attributes to a set of the set of target attributes based on a set of automated mapping rules. The operations of 1035 may be performed according to the methods described herein. In some examples, aspects of the operations of 1035 may be performed by an attribute mapping component as described with reference to FIGS. 6 through 8.

Figure 11:
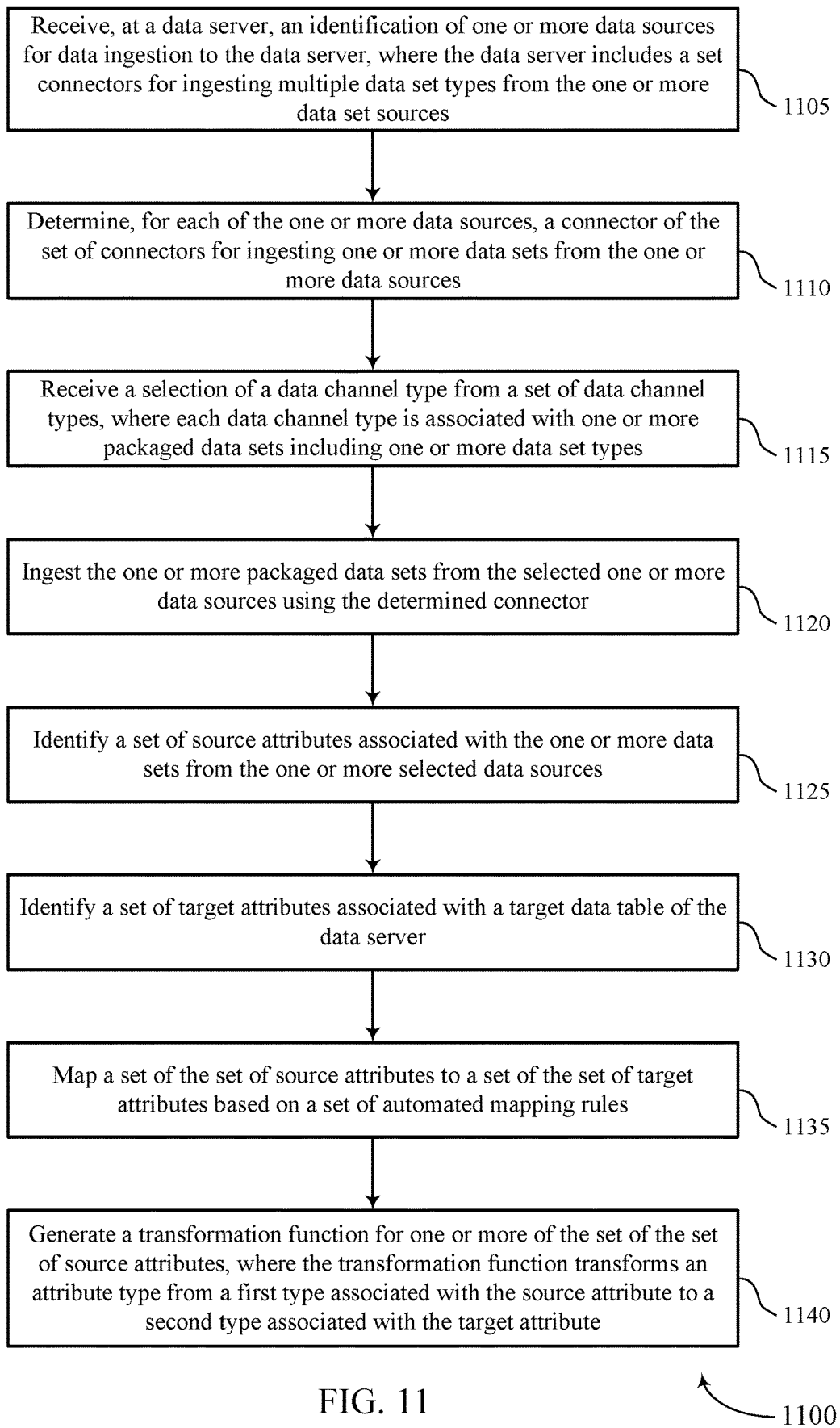

FIG. 11 shows a flowchart illustrating a method 1100 that supports prepackaged data ingestion from various data sources in accordance with aspects of the present disclosure. The operations of method 1100 may be implemented by a database server or its components as described herein. For example, the operations of method 1100 may be performed by a controller as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1105, the database server may receive, at a data server, an identification of one or more data sources for data ingestion to the data server, where the data server includes a set connectors for ingesting multiple data set types from the one or more data set sources. The operations of 1105 may be performed according to the methods described herein. In some examples, aspects of the operations of 1105 may be performed by a data source identifier as described with reference to FIGS. 6 through 8.

At 1110, the database server may determine, for each of the one or more data sources, a connector of the set of connectors for ingesting one or more data sets from the one or more data sources. The operations of 1110 may be performed according to the methods described herein. In some examples, aspects of the operations of 1110 may be performed by a connector component as described with reference to FIGS. 6 through 8.

At 1115, the database server may receive a selection of a data channel type from a set of data channel types, where each data channel type is associated with one or more packaged data sets including one or more data set types. The operations of 1115 may be performed according to the methods described herein. In some examples, aspects of the operations of 1115 may be performed by a channel type selector as described with reference to FIGS. 6 through 8.

At 1120, the database server may ingest the one or more packaged data sets from the selected one or more data sources using the determined connector. The operations of 1120 may be performed according to the methods described herein. In some examples, aspects of the operations of 1120 may be performed by a data ingestion component as described with reference to FIGS. 6 through 8.

At 1125, the database server may identify a set of source attributes associated with the one or more data sets from the one or more selected data sources. The operations of 1125 may be performed according to the methods described herein. In some examples, aspects of the operations of 1125 may be performed by an attribute identifier as described with reference to FIGS. 6 through 8.

At 1130, the database server may identify a set of target attributes associated with a target data table of the data server. The operations of 1130 may be performed according to the methods described herein. In some examples, aspects of the operations of 1130 may be performed by an attribute identifier as described with reference to FIGS. 6 through 8.

At 1135, the database server may map a set of the set of source attributes to a set of the set of target attributes based on a set of automated mapping rules. The operations of 1135 may be performed according to the methods described herein. In some examples, aspects of the operations of 1135 may be performed by an attribute mapping component as described with reference to FIGS. 6 through 8.

At 1140, the database server may generate a transformation function for one or more of the set of the set of source attributes, where the transformation function transforms an attribute type from a first type associated with the source attribute to a second type associated with the target attribute. The operations of 1140 may be performed according to the methods described herein. In some examples, aspects of the operations of 1140 may be performed by a transformation function component as described with reference to FIGS. 6 through 8.

A method of data processing is described. The method may include receiving, at a data server, an identification of one or more data sources for data ingestion to the data server, where the data server includes a set connectors for ingesting multiple data set types from the one or more data set sources, determining, for each of the one or more data sources, a connector of the set of connectors for ingesting one or more data sets from the one or more data sources, receiving a selection of a data channel type from a set of data channel types, where each data channel type is associated with one or more packaged data sets including one or more data set types, and ingesting the one or more packaged data sets from the selected one or more data sources using the determined connector.

An apparatus for data processing is described. The apparatus may include a processor, memory coupled with the processor, and instructions stored in the memory. The instructions may be executable by the processor to cause the apparatus to receive, at a data server, an identification of one or more data sources for data ingestion to the data server, where the data server includes a set connectors for ingesting multiple data set types from the one or more data set sources, determine, for each of the one or more data sources, a connector of the set of connectors for ingesting one or more data sets from the one or more data sources, receive a selection of a data channel type from a set of data channel types, where each data channel type is associated with one or more packaged data sets including one or more data set types, and ingest the one or more packaged data sets from the selected one or more data sources using the determined connector.

Another apparatus for data processing is described. The apparatus may include means for receiving, at a data server, an identification of one or more data sources for data ingestion to the data server, where the data server includes a set connectors for ingesting multiple data set types from the one or more data set sources, determining, for each of the one or more data sources, a connector of the set of connectors for ingesting one or more data sets from the one or more data sources, receiving a selection of a data channel type from a set of data channel types, where each data channel type is associated with one or more packaged data sets including one or more data set types, and ingesting the one or more packaged data sets from the selected one or more data sources using the determined connector.

A non-transitory computer-readable medium storing code for data processing is described. The code may include instructions executable by a processor to receive, at a data server, an identification of one or more data sources for data ingestion to the data server, where the data server includes a set connectors for ingesting multiple data set types from the one or more data set sources, determine, for each of the one or more data sources, a connector of the set of connectors for ingesting one or more data sets from the one or more data sources, receive a selection of a data channel type from a set of data channel types, where each data channel type is associated with one or more packaged data sets including one or more data set types, and ingest the one or more packaged data sets from the selected one or more data sources using the determined connector.

Some examples of the method, apparatuses, and non-transitory computer-readable medium described herein may further include operations, features, means, or instructions for identifying a set of source attributes associated with the one or more data sets from the one or more selected data sources, identifying a set of target attributes associated with a target data table of the data server, and mapping a set of the set of source attributes to a set of the set of target attributes based on a set of automated mapping rules.

In some examples of the method, apparatuses, and non-transitory computer-readable medium described herein, mapping the set of the set of source attributes to the set of the set of target attributes may include operations, features, means, or instructions for matching an identifier of one or more source attributes to an identifier of one or more target attributes.

In some examples of the method, apparatuses, and non-transitory computer-readable medium described herein, mapping the set of the set of source attributes to the set of the set of target attributes may include operations, features, means, or instructions for generating a transformation function for one or more of the set of the set of source attributes, where the transformation function transforms an attribute type from a first type associated with the source attribute to a second type associated with the target attribute.

In some examples of the method, apparatuses, and non-transitory computer-readable medium described herein, generating the transformation function for one or more of the set of the set of source attributes may include operations, features, means, or instructions for running a machine learning model to generate the set of automated mapping rules.

Some examples of the method, apparatuses, and non-transitory computer-readable medium described herein may further include operations, features, means, or instructions for displaying a mapping indicator indicating a mapping between the set of the set of source attributes and the set of the set of target attributes.

Some examples of the method, apparatuses, and non-transitory computer-readable medium described herein may further include operations, features, means, or instructions for displaying a transformation function indicator indicating a selected transformation function, one or more additional transformation formulas, a custom transformation function input field, a transformation function test field, or a combination thereof.

In some examples of the method, apparatuses, and non-transitory computer-readable medium described herein, an identifier of at least one source attribute may be different than an identifier of at least one corresponding mapped target attribute.

Some examples of the method, apparatuses, and non-transitory computer-readable medium described herein may further include operations, features, means, or instructions for displaying a manual mapping indicator for one or more unmapped source attributes, and mapping the one or more unmapped source attributes to one or more unmapped target attributes based on user input via the manual mapping indicator.

Some examples of the method, apparatuses, and non-transitory computer-readable medium described herein may further include operations, features, means, or instructions for displaying a data ingestion status window including an indication of a number of ingested data records, an indication of a live data activity feed associated with the ingested data, or a combination thereof.

In some examples of the method, apparatuses, and non-transitory computer-readable medium described herein, the data channel type includes an email channel, a short message service (SMS) messaging channel, an in-application push messaging channel, or a combination thereof.

In some examples of the method, apparatuses, and non-transitory computer-readable medium described herein, the one or more data sources include internal data sources, external data sources, or both.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, at a data server and from a first user input, an identification of a data source type associated with one or more data sources for data ingestion to the data server, wherein the data server includes a plurality of connectors for ingesting multiple data set types of different formats from the one or more data sources of the data source type;

determining, for at least one data source of the one or more data sources, a connector of the plurality of connectors for ingesting one or more data sets from the one or more data sources of the data source type;

receiving, from a second user input, a selection of a data channel type for the one or more data sources from a plurality of data channel types, wherein each data channel type is associated with one or more packaged data sets comprising one or more data set types;

determining, using the connector for the at least one data source of the one or more data sources, a plurality of source attributes in the one or more data sets from the one or more data sources based at least in part on the selection of the data channel type;

mapping a set of the plurality of source attributes to a set of a plurality of target attributes associated with the data server based at least in part on a set of automated mapping rules, wherein the set of automated mapping rules are generated based at least in part on a machine learning model trained on one or more user-alterable mapping indicators that indicate, via a user interface, one or more mappings and one or more user-alterable transformation function indicators that indicate, via the user interface, one or more transformation functions, wherein the one or more user-alterable mapping indicators and the one or more user-alterable transformation function indicators define a previous mapping between previous data and a data model that describes communication events associated with a communication channel, and wherein the set of automated mapping rules are further generated based at least in part on a quantity of possible values of one or more of the plurality of source attributes; and ingesting the one or more packaged data sets from the selected data channel type using the determined connector based at least in part on the mapping.

2. The method of claim 1, further comprising:
identifying the plurality of source attributes associated with the one or more data sets from the selected data channel type; and
identifying the plurality of target attributes associated with a target data table of the data server.

3. The method of claim 2, wherein mapping the set of the plurality of source attributes to the set of the plurality of target attributes comprises:
matching an identifier of one or more source attributes to an identifier of one or more target attributes.

4. The method of claim 2, wherein mapping the set of the plurality of source attributes to the set of the plurality of target attributes comprises:
generating a transformation function for one or more source attributes of the set of the plurality of source attributes, wherein the transformation function transforms an attribute type from a first type associated with the one or more source attributes to a second type associated with a target attribute.

5. The method of claim 4, wherein generating the transformation function for one or more of the set of the plurality of source attributes comprises:
running the machine learning model to generate the set of automated mapping rules.

6. The method of claim 4, further comprising:
displaying a mapping indicator indicating a mapping between the set of the plurality of source attributes and the set of the plurality of target attributes.

7. The method of claim 4, further comprising:
displaying a transformation function indicator indicating a selected transformation function, one or more additional transformation formulas, a custom transformation function input field, a transformation function test field, or a combination thereof.

8. The method of claim 4, wherein an identifier of at least one source attribute is different than an identifier of at least one corresponding mapped target attribute.

9. The method of claim 2, further comprising:
displaying a manual mapping indicator for one or more unmapped source attributes; and
mapping the one or more unmapped source attributes to one or more unmapped target attributes based at least in part on user input via the manual mapping indicator.

10. The method of claim 2, further comprising:
displaying a data ingestion status window comprising an indication of a number of ingested data records, an indication of a live data activity feed associated with the ingested one or more packaged data sets, or a combination thereof.

11. The method of claim 1, wherein the data channel type comprises an email channel, a short message service (SMS) messaging channel, an in-application push messaging channel, or a combination thereof.

12. The method of claim 1, wherein the data source type comprises internal data sources, external data sources, or both.

13. An apparatus for data processing, comprising:
a processor,
memory coupled with the processor; and
instructions stored in the memory and executable by the processor to cause the apparatus to:

receive, at a data server and from a first user input, an identification of a data source type associated with one or more data sources for data ingestion to the data server, wherein the data server includes a plurality of connectors for ingesting multiple data set types of different formats from the one or more data sources of the data source type;
determine, for at least one data source of the one or more data sources, a connector of the plurality of connectors for ingesting one or more data sets from the one or more data sources of the data source type;
receive, from a second user input, a selection of a data channel type for the one or more data sources from a plurality of data channel types, wherein each data channel type is associated with one or more packaged data sets comprising one or more data set types;
determine, using the connector for the at least one data source of the one or more data sources, a plurality of source attributes in the one or more data sets from the one or more data sources based at least in part on the selection of the data channel type;
map a set of the plurality of source attributes to a set of a plurality of target attributes associated with the data server based at least in part on a set of automated mapping rules, wherein the set of automated mapping rules are generated based at least in part on a machine learning model trained on one or more user-alterable mapping indicators that indicate, via a user interface, one or more mappings and one or more user-alterable transformation function indicators that indicate, via the user interface, one or more transformation functions, wherein the one or more user-alterable mapping indicators and the one or more user-alterable transformation function indicators define a previous mapping between previous data and a data model that describes communication events associated with a communication channel, and wherein the set of automated mapping rules are further generated based at least in part on a quantity of possible values of one or more of the plurality of source attributes; and
ingest the one or more packaged data sets from the selected data channel type using the determined connector based at least in part on the mapping.

14. The apparatus of claim 13, wherein the instructions are further executable by the processor to cause the apparatus to:
identify the plurality of source attributes associated with the one or more data sets from the selected data channel type; and
identify the plurality of target attributes associated with a target data table of the data server.

15. The apparatus of claim 14, wherein the instructions to map the set of the plurality of source attributes to the set of the plurality of target attributes are executable by the processor to cause the apparatus to:
match an identifier of one or more source attributes to an identifier of one or more target attributes.

16. The apparatus of claim 14, wherein the instructions to map the set of the plurality of source attributes to the set of the plurality of target attributes are executable by the processor to cause the apparatus to:
generate a transformation function for one or more source attributes of the set of the plurality of source attributes, wherein the transformation function transforms an attribute type from a first type associated with the one or more source attributes to a second type associated with a target attribute.

17. The apparatus of claim 16, wherein the instructions to generate the transformation function for one or more of the set of the plurality of source attributes are executable by the processor to cause the apparatus to:

run the machine learning model to generate the set of automated mapping rules.

18. The apparatus of claim 16, wherein the instructions are further executable by the processor to cause the apparatus to:

display a mapping indicator indicating a mapping between the set of the plurality of source attributes and the set of the plurality of target attributes.

19. A non-transitory computer-readable medium storing code for data processing, the code comprising instructions executable by a processor to:

receive, at a data server and from a first user input, an identification of a data source type associated with one or more data sources for data ingestion to the data server, wherein the data server includes a plurality of connectors for ingesting multiple data set types of different formats from the one or more data sources of the data source type;

determine, for at least one data source of the one or more data sources, a connector of the plurality of connectors for ingesting one or more data sets from the one or more data sources of the data source type;

receive, from a second user input, a selection of a data channel type for the one or more data sources from a plurality of data channel types, wherein each data channel type is associated with one or more packaged data sets comprising one or more data set types;

determine, using the connector for the at least one data source of the one or more data sources, a plurality of source attributes in the one or more data sets from the one or more data sources based at least in part on the selection of the data channel type;

map a set of the plurality of source attributes to a set of a plurality of target attributes associated with the data server based at least in part on a set of automated mapping rules, wherein the set of automated mapping rules are generated based at least in part on a machine learning model trained on one or more user-alterable mapping indicators that indicate, via a user interface, one or more mappings and one or more user-alterable transformation function indicators that indicate, via the user interface, one or more transformation functions, wherein the one or more user-alterable mapping indicators and the one or more user-alterable transformation function indicators define a previous mapping between previous data and a data model that describes communication events associated with a communication channel, and wherein the set of automated mapping rules are further generated based at least in part on a quantity of possible values of one or more of the plurality of source attributes; and ingest the one or more packaged data sets from the selected data channel type using the determined connector.

20. The non-transitory computer-readable medium of claim 19, wherein the instructions are further executable to:

identify the plurality of source attributes associated with the one or more data sets from the selected data channel type; and identify the plurality of target attributes associated with a target data table of the data server.

\* \* \* \* \*